US005139847A

United States Patent [19]

Breen

[11] Patent Number: 5,139,847

[45] Date of Patent: Aug. 18, 1992

[54] CONTINUOUS TAGS SUCH AS DEMAND TAGS AND METHOD OF MAKING SAME

[75] Inventor: Thomas J. Breen, Northbrook, Ill.

[73] Assignee: Rand McNally & Company, Skokie, Ill.

[21] Appl. No.: 670,954

[22] Filed: Mar. 18, 1991

[51] Int. Cl.[5] .......................... B32B 3/06; B32B 3/08; B32B 3/10

[52] U.S. Cl. .......................................... 428/40; 428/43; 428/136; 428/137; 428/202; 283/81

[58] Field of Search ................. 428/43, 136, 202, 137, 428/40, 41, 42; 40/299; 283/81

[56] References Cited

U.S. PATENT DOCUMENTS

| | | | |
|---|---|---|---|
| 2,095,437 | 10/1937 | Fox | 40/2 R |
| 4,201,613 | 5/1980 | Olivieri et al. | 156/270 |
| 4,214,024 | 7/1980 | Jacobson | 428/202 |
| 4,219,596 | 8/1980 | Takemoto et al. | 428/41 |
| 4,285,999 | 8/1981 | Olivieri et al. | 428/40 |
| 4,913,926 | 4/1990 | Rutkowski | 428/40 |

*Primary Examiner*—Alexander S. Thomas
*Attorney, Agent, or Firm*—Dressler, Goldsmith, Shore, Sutker & Milnamow, Ltd.

[57] ABSTRACT

A continuous series of elongate adhesive tags such as demand tags having adhesive-free transverse zones for severing individual demand tags from the series. The series has continuous longitudinal adhesive-free zones and longitudinal stripes of pressure sensitive adhesive which are interrupted in the transverse zones by a transverse slot formed across the entire width of each adhesive stripe, thereby providing the adhesive-free transverse zones. A method of so forming the continuous series of tags is also disclosed.

5 Claims, 2 Drawing Sheets

CONTINUOUS TAGS SUCH AS DEMAND TAGS AND METHOD OF MAKING SAME

BACKGROUND OF THE INVENTION

Tags or labels which are severable or separable sequentially from an elongated continuous supply or series of such tags, such as demand tags, are used extensively in a variety of environments, including the transportation industry. Such tags frequently are used as baggage tags which are dispensed on demand, one at a time, by severing a tag from the continuous series, as with a suitable cutting blade. All of that is conventional.

Frequently demand tags are self-adhering and comprise a tag provided with self-adhering pressure sensitive adhesive and a backing sheet. The backing sheet is eventually fully or partially removed to expose the adhesive area, and the tag itself is then affixed to the object to which it is intended to be attached, such as to a piece of luggage. It will be appreciated that when a self-adhering tag is cut from a continuous supply, typically the blade or knife will cut through the adhesive, and will eventually become gummed up and/or foul the equipment with which the blade is associated.

Attempts have been made to avoid that problem. For example, continuous tag stock defining transverse or patterned zones free of adhesive have been suggested so that when a transverse cut is made, the cut is through a zone where adhesive is not present. Of course, this presents a number of drawbacks including material waste, leaving ends on tags without adhesive which can cause the edges to curl and interfere with the proper functioning of the tag, and difficulties in providing the necessary pattern. Further, even if patterning is provided, the adhesive may tend to extrude into the zone in which transverse cutting is to occur.

Another approach has been to apply self-adhering labels to a backing sheet in a longitudinally spaced apart array to provide a series of demand tags. Thus the space between the labels or tags, sometimes referred to as the matrix, will be adhesive-free and that zone can be cut through without having a knife or blade come into contact with adhesive. It also exposes free edges to separation from the backing sheet often causing equipment jams and failures. That process is also slower and more costly than is desireable.

Thus there remains a need for providing demand tags which are inexpensive and which insure that transverse cuts which are intended to separate a demand tag from a continuous series or supply of such tags do not engage adhesive which will tend to foul blades or the equipment for utilizing and dispensing such tags.

SUMMARY OF THE INVENTION

In accordance with the present invention improved tags such as demand tags and a method for producing a continuous series of such tags are provided.

Each tag is severable from the series along a transverse line of severance. The series of tags comprises continuous tag label stock, at least one continuous longitudinal stripe of pressure sensitive adhesive deposited on the back of the continuous tag label stock, at least one continuous longitudinal zone free of adhesive on the back of the continuous tag label stock, and a continuous backing sheet coextensive with the tag label stock in contact with the pressure sensitive adhesive and adapted to be readily removed therefrom.

Transverse zones for dividing the continuous series into individual elongate tags are provided. For each continuous adhesive stripe, the zones include a transverse slot extending through the stock, the continuous adhesive stripe, and the backing sheet across the entire width of the adhesive stripe, so that when a transverse blade cut is made in the transverse zone to sever a tag from the series, the blade will not cut through any adhesive.

Desirably continuous longitudinal zones free of adhesive on the back of said tag label stock lie along each longitudinal edge thereof and in a preferred form there are at least two continuous longitudinal pressure sensitive adhesive stripes separated by an intermediate longitudinal zone free of adhesive. A transverse slot extends across the entire width of each continuous adhesive stripe. In a most preferred form the transverse slots each intersect the adjacent intermediate and narrow adhesive-free zones. Feed slot means may be provided in the transverse zones as well.

The method of making a continuous series of elongate demand tags, each of which is severable from the other along a transverse zone which is free of adhesive, comprises the steps of providing continuous tag label stock with at least one continuous longitudinal stripe of pressure sensitive adhesive deposited on the back of the continuous tag label stock and at least one continuous longitudinal zone free of adhesive on the back of the continuous tag label stock, and a readily removable coextensive backing sheet applied to the pressure sensitive adhesive side of the continuous tag label stock, and providing adhesive-free transverse zones for severing the continuous series into individual elongate demand tags by forming a transverse slot in the transverse zones extending through the tag label stock and the backing sheet across the entire width of each continuous adhesive stripe, so that when a transverse blade cut is made in the transverse zone to sever a demand tag from the series, the severing means, such as a blade or bursting bar, will not cut through any adhesive.

Further objects, features and advantages of the present invention will become apparent from the following description and drawings.

DESCRIPTION OF THE PREFERRED EMBODIMENT

Figure 1:
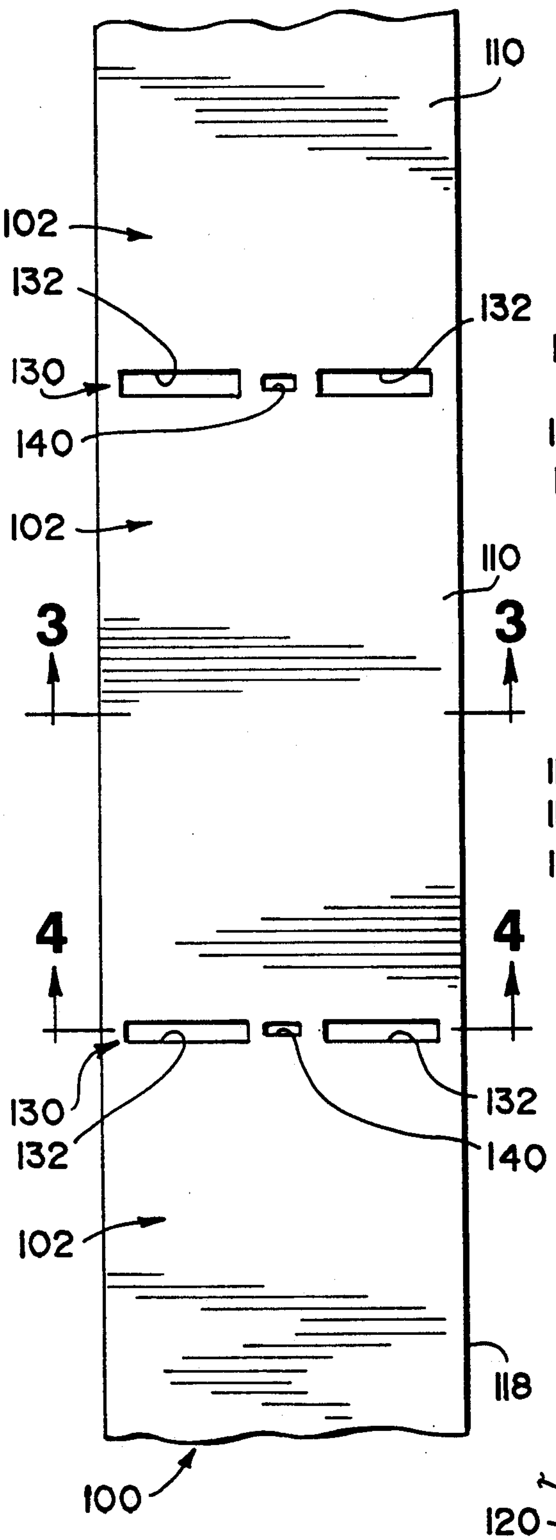
FIG. 1 is a plan view of a continuous series of demand tags made in accordance with the present invention.
Figure 2:
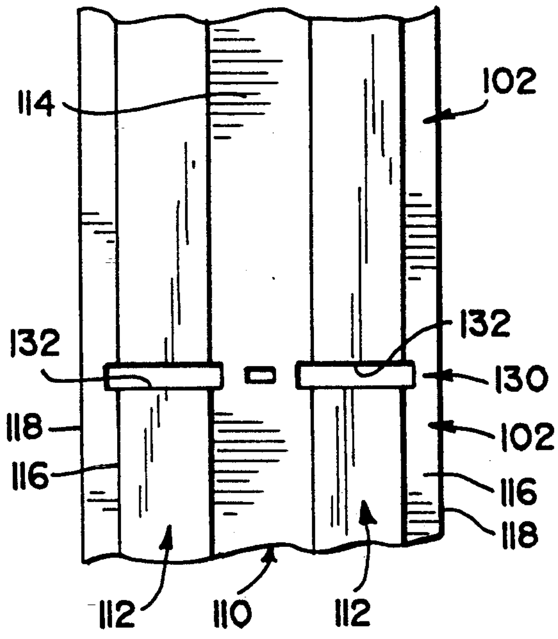
FIG. 2 is a rear view of the tag label stock of FIG. 1.
Figure 3:
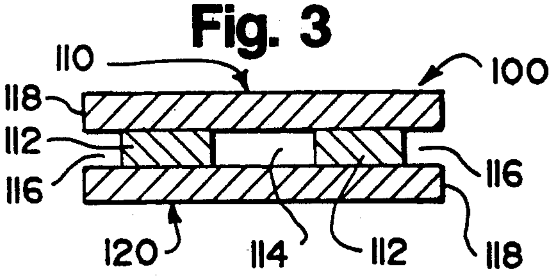
FIG. 3 is a cross-sectional view of FIG. 1 taken along line 3—3 of FIG. 1.
Figure 4:
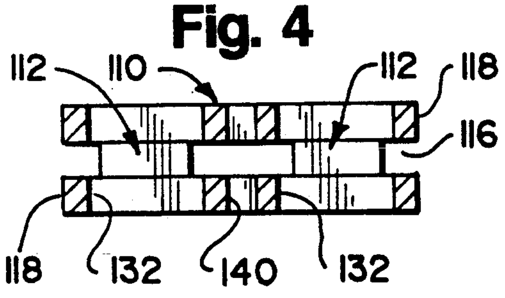
FIG. 4 is a cross-sectional view of FIG. 1 taken along line 4—4 of FIG. 1.

Referring now to the drawings, FIGS. 1–4 illustrate a presently preferred form of tags made in accordance with the present invention. As best seen in FIG. 1, a continuous series or supply 100 of elongate demand labels or tags 102 is provided. Supply 100 is formed of a continuous strip of tab label stock 110 which may be of paper or of a variety of plastic film materials known and currently in use.

One or more continuous longitudinal stripes of pressure-sensitive adhesive of a conventional type are deposited on the back of the tag label stock. In FIGS. 1–4, two such stripes 112 are illustrated. A continuous longitudinal zone 114 zone free of adhesive is provided between the adhesive stripes 112. Additionally, a continuous narrow longitudinal zone 116 free of adhesive is provided along each longitudinal edge 118 of the tag label supply 100. A conventional continuous backing sheet 120, generally coextensive with the tag label stock is provided. Sheet 120 is readily removable from the tag label stock, and to that end readily parts from the adhesive when gripped and pulled away.

As will be appreciated, the continuous supply 100 is intended and adapted to be divided into individual demand tags along transverse lines of severance. Thus each demand tag 102 in the continuous supply is defined by transverse zones 130 for dividing the supply into individual demand tags. Each transverse zone is provided with a transverse slot 132 for each longitudinal adhesive stripe 112.

Each transverse slot 132 extends through the tag label stock 102, its associated adhesive stripe 112 and the backing sheet 120 across the entire width of the associated stripe 112. Preferably the widths of the slots 132 are slightly greater than the widths of the associated stripe 112 to assure that all adhesive of the stripe 112 is removed in the transverse zone.

In the embodiment of FIGS. 1 to 4, there are two transverse aligned slots 132, each of which extends slightly into the adjacent intermediate and narrow edge zones 114 and 116 respectively. As such it will be apparent that when a transverse cut is made by a blade to sever a demand tag in a transverse zone 130, the blade will cut through the longitudinal adhesive-free zones and the slots 132 and will not cut through any adhesive. As such, neither the cutting blade, nor any associated equipment will become fouled with adhesive, as is a common occurrence with currently used self-adhering demand tags.

It may be desirable to provide other formations in the continuous series of demand tags. For example, one or more conventional feed slots 140 may be provided for the series in each transverse zone.

The individual demand tags may comprise multiple segments, such as a baggage tag and a claim check which have been precut through the tag label stock only. Other formations, depending on the nature of the demand tag and the use to which it is to be put may be used as well.

Figure 5:
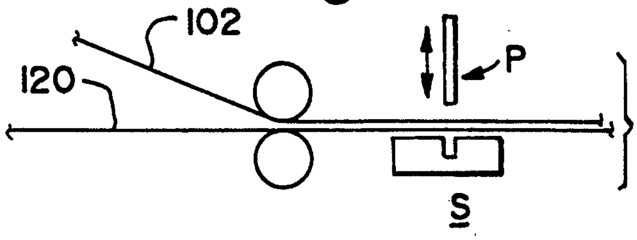
FIG. 5 is a schematic view of apparatus adapted to make the demand tags of FIG. 1.

Referring now to FIG. 5, a schematic representation of apparatus practicing the method of the present invention is there shown. FIG. 5 shows a continuous supply of tag label stock 102 which has been provided with one or more suitable stripes of pressure sensitive adhesive. A continuous backing sheet supply 120 is joined with the tag label stock to provide a continuous series 100 of elongate demand tags. The supply 100 is then presented to a station S at which the transverse zones in which the supply is later to be separated into individual elongate demand tags are formed with transverse slots 132. Typically a punching die, such as one including a reciprocating punch P, is used to form the slots 132. Other formations, such as the feed slots 140, may be similarly or otherwise appropriately formed.

The demand tag stock supply may be printed with desired text at any appropriate time and the series of demand tags may be stored for use in roll form or in fan-folded form, or otherwise.

It will be apparent that other arrangements of longitudinal adhesive stripes and longitudinal adhesive-free zones may also be employed. As long as a transverse slot is provided for each adhesive stripe in each transverse zone of severance, the continuous series may be divided into individual demand tags by a severing means such as a cutting blade or knife or bursting bar, without build up of adhesive and eventual possible fouling due to that build up.

Alternate adhesive stripe/adhesive-free zone arrangements adapted for use with suitable associated slots in the transverse zones of severance are illustrated by FIGS. 6 to 9, in which the tag stock and backing sheets bear the same part numbers and the adhesive stripes and longitudinal adhesive-free zones bear the same numbers as used in connection with the embodiment of FIGS. 1–4, but with suffixes added.

Figure 6:
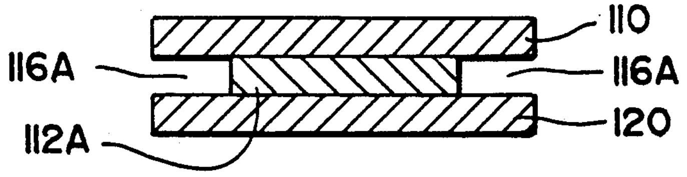
FIGS. 6 to 9 are cross-sectional views similar to FIG. 3, but of different longitudinal adhesive stripe arrangements.
Figure 7:
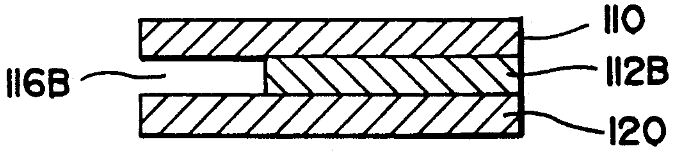
Figure 8:
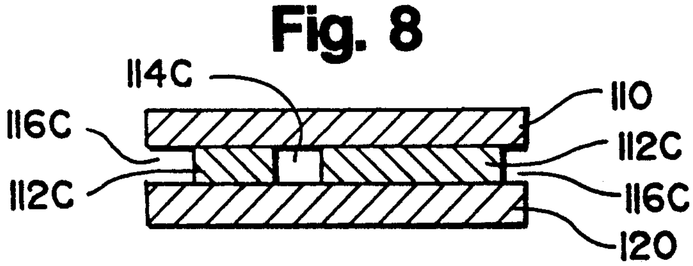
Figure 9:
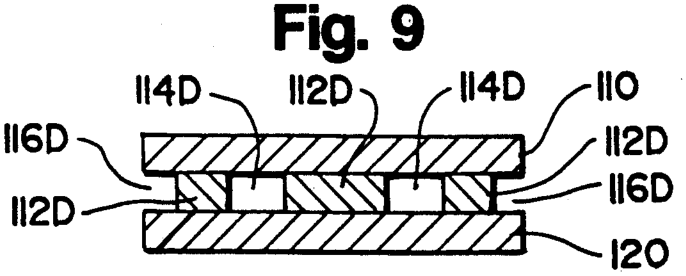

Thus, FIG. 6 which has only one adhesive stripe 112A would use a single transverse slot in each transverse zone, but would have two adhesive-free longitudinal zones, hence two zones of connection between adjacent pairs of tags in the series after having the transverse slot provided. In the case of FIG. 7, a single slot formed would leave a single zone of connection for longitudinally adjacent demand tags in a series. FIG. 8 is like the embodiment of FIGS. 1–4, except that the stripes 112C are of unequal width and FIG. 9 shows that more than two longitudinal stripes of adhesive may be used as well. In that case the continuous series would have three adjacent transverse slots, one for each adhesive stripe.

It will be apparent to those skilled in the art that variations of the disclosed embodiments may be made without departing from the spirit and scope of the invention. As such the invention is intended to be limited only as may be necessary in view of the appended claims.

What is claimed is:

1. A continuous series of elongate adhesive tags, each of which is severable from the series along a transverse line of severance, said continuous series comprising:

continuous tag label stock, at least one continuous longitudinal stripe of pressure sensitive adhesive deposited on the back of said continuous tag label stock and at least one continuous longitudinal zone free of adhesive on the back of said continuous tag label stock, and a continuous backing sheet coextensive with said tag label stock in contact with said pressure sensitive adhesive and adapted to be readily removed therefrom, transverse zones for dividing said continuous series into individual elongate demand tags, and for each and every continuous adhesive stripe, a transverse slot formed in each transverse zone extending through said stock, said continuous adhesive stripe, and said backing sheet across the entire width of said adhesive stripe so that there is no adhesive remaining in said transverse zones, whereby when transverse cuts are made in said transverse zones to sever tags from said series, no adhesive will be cut through.

2. The continuous series of elongate adhesive tags in accordance with claim 1, and wherein said continuous tab label stock defines a narrow continuous longitudinal zone free of adhesive on the back of said tag label stock along each longitudinal edge thereof.

3. The continuous series of elongate adhesive tags in accordance with claim 1, and wherein there are at least two continuous longitudinal pressure sensitive adhesive stripes separated by an intermediate longitudinal zone free of adhesive and a separate transverse slot extends across the entire width of each said continuous adhesive stripe.

4. The continuous series of elongate adhesive tags in accordance with claim 3, and further including a narrow continuous longitudinal zone free of adhesive on the back of said tag label stock along each longitudinal edge thereof, with the transverse slot intersecting the adjacent intermediate and narrow longitudinal adhesive-free zones.

5. The continuous series of elongate adhesive tags in accordance with claim 1, and further including feed slot means in said transverse zones.

* * * * *